Patented Dec. 29, 1925.

1,567,668

UNITED STATES PATENT OFFICE.

GUSTAV MOSEBACH, OF NORDHAUSEN, GERMANY.

PROCESS FOR RECOVERING THE LYE FROM DISINTEGRATED CELLULOSES.

No Drawing. Original application filed July 5, 1924, Serial No. 724,454. Divided and this application filed May 5, 1925. Serial No. 28,254.

*To all whom it may concern:*

Be it known that I, GUSTAV MOSEBACH, a citizen of the German Republic, residing at Nordhausen am Harz, Germany, have invented certain new and useful Improvements in Processes for Recovering the Lye from Disintegrated Celluloses, of which the following is a specification.

According to this application, which is a division of my application Ser. No. 724,454 previously filed on July 5, 1924, the cellulose and the un-diluted lye are heated to about 70° C. in being agitated, and the lye is squeezed out. To recover the last remainder of the lye the cellulose is heated with hot water of a temperature of approximately 70° C. and energetically agitated whereupon the hot water is removed by compressing the cellulose. The un-diluted lye squeezed out at the first phase of the process is re-used for disintegrating fresh cellulose. This un-diluted lye is about 90% of the total quantity of lye. The remaining 10% of lye is almost entirely recovered at the second phase of the process by disintegrating in the press the cellulose, which has been previously freed of the lye, into the tiniest possible particles, by saturating the cellulose at the disintegrated state with hot water and by submitting the mixture to pressure in simultaneously stirring the same energetically. The hot water admixed with the residue of lye can be employed in the preparation of fresh lye.

This process possesses the following characteristics and presents the following advantages:

The material which after the disintegration is delivered from the boiling vessels comprises normally 15 to 16% cellulose. This percentage of cellulose in the solution at the delivering end of the pressing worm is bound to a determined limit with regard to the safety of working. These percentages of cellulose in the solution delivered from the press amount in normal continuous working from 50 to 60%. If the solute from the boiling vessel would be charged into the press at a percentage of 16% of cellulose and if the squeezing out would be 55% about 6% of the lye originally contained in the material would remain in the pressed substance so that at the second squeezing out a lixiviation would be obtained which is too thick to be re-used. If this thick lixiviation is considered as waste the economy of the manufacturing process would be impaired. The result is however much more favorable if after the disintegration the material is diluted with lye. At a percentage of cellulose of 6% of the cellulose charged into the apparatus and at a squeezing out of again 55% of the cellulose at the delivering end of the pressing worm approximately only 5,2% of the lye originally contained in the cellulose would remain in the material. It is evident therefore that the thicker the mixture is the greater will be the loss of lye. The recovering of all the lye is however important. It is further more difficult to squeeze out a thicker mixture and the efficiency of the presses will in this case be very low.

The advantage of the improved process consists therefore in that, by diluting the mixture from the boiling vessels prior to the squeezing out the loss in the squeezed out material is considerably reduced. The heating to approximately 70° C. is necessary to facilitate the squeezing out of the smeary material.

To obtain continuous working, the substance which has been preliminarily freed from the lye, and which has been disintegrated, is dissolved in hot water, whereby the compressed lumps are disintegrated, a temperature favorable for the squeezing out being obtained at the same time. The advantage of an energetical squeezing out of the substance is proved by the following consideration: When linen is being wrung out energetically the outflowing water contains soap solutions and dirt, but when linen is being rinsed the water remains quite clear. Squeezing the water out of the cellulose is consequently to be considered as the last, very energetical and efficacious cleaning process.

I claim:—

A method for the recuperation of the lye from dissolved straw cellular substance and the like consisting in heating the straw cellular substance together with undiluted lye to approximately 70° C., in stirring the mixture continuously during the heating, in compressing the material to squeeze out the lye, in treating the compressed material with hot water at approximately 70° C., in stirring this mass, in squeezing out the hot water containing approximately 10% of lye and in re-using the squeezed out lye in the preparation of fresh lye.

In testimony whereof I affix my signature.

GUSTAV MOSEBACH.